United States Patent [19]

Ishibashi et al.

[11] 4,316,656
[45] Feb. 23, 1982

[54] INFORMATION DISPLAY ARRANGEMENT FOR CAMERA

[75] Inventors: Takao Ishibashi, Higashiyamato; Kenjiro Osonoi, Tokorozawa, both of Japan

[73] Assignee: Osawa Precision Industries, Ltd., Tokyo, Japan

[21] Appl. No.: 198,838

[22] Filed: Oct. 20, 1980

Related U.S. Application Data

[62] Division of Ser. No. 39,994, May 17, 1979, Pat. No. 4,279,481.

[30] Foreign Application Priority Data

May 22, 1978 [JP] Japan ................................. 53-67845

[51] Int. Cl.³ ............................................. G03B 1/60
[52] U.S. Cl. .................................................. 352/172
[58] Field of Search ......................... 352/172; 354/289

[56] References Cited

FOREIGN PATENT DOCUMENTS 2322033 11/1974 Fed. Rep. of Germany ...... 352/172

Primary Examiner—Michael L. Gellner
Attorney, Agent, or Firm—Robert E. Wagner; Ralph R. Rath

[57] ABSTRACT

An information display arrangement is provided in a viewfinder of a movie camera or the like. The information display arrangement includes a first array of function indicators and a second array of quantity indicators. The function indicators are selectively actuable by a switch arrangement operated by the camera user and the quantity indicators display the quantity of the camera function selected. The information display arrangement also includes apparatus for accurately displaying battery voltage status and film supply information independent of the switch setting by the camera user.

9 Claims, 5 Drawing Figures

INFORMATION DISPLAY ARRANGEMENT FOR CAMERA

REFERENCE TO RELATED APPLICATION

This application is a divisional of U.S. Ser. No. 39,994, filed May 17, 1979 now U.S. Pat. No. 4,279,481.

BACKGROUND OF THE INVENTION

1. Field of the Invention

The present invention relates generally to information display arrangements for cameras and the like and more specifically to an information display arrangement in the viewfinder of a movie camera wherein the camera user selects a camera function to be displayed by a switch arrangement and the quantity of the selected function is displayed in the viewfinder.

2. Description of the Prior Art

As movie cameras and the like become more sophisticated so as to provide numerous functions, it has become desirable to indicate in the viewfinder of the camera the necessary information for operation of the camera such as battery voltage, remaining length of the film supply and the status of other functions of the camera. In this way, the camera user can be apprised of the operational status of the camera through the viewfinder.

For example, a viewfinder display arrangement for a camera is disclosed in U.S. application Ser. No. 943,429 filed by Pichard K. Carlson on Sept. 8, 1978. The viewfinder display disclosed therein provides useful function and status information of camera operation under the control of various function test select buttons disposed about the camera housing. Function indicators are arranged along the top of the viewfinder and quantity indicators representing the quantity of the selected camera function are displayed on the bottom of the viewfinder. Further, the viewfinder display acts as a warning system independent of operation of the various function test buttons by actuating the appropriate function indicator when the battery is marginally sufficient for operation, or when the film supply is very close to being used up, or when poor exposure conditions are encountered. Further, an all-test button is provided to actuate the various function indicators with respective quantity indications by the quantity indicator in a test function sequence for a readout of all of the displayed camera functions. The various functions and respective quantities of the camera function are sequentially read out and all tests function and warning display control is accomplished by a microprocessor arranged as a central processing unit.

While the above described arrangements are generally suitable for their intended use in a camera control system, it would be desirable to provide an information display arrangement in the viewfinder of a camera wherein a rotary switch arrangement selectively controls the display of camera functions and respective quantity indications in the viewfinder. Further, it would be desirable to provide an automatic display of various predetermined camera functions and a manually selectable display for other camera functions.

Accordingly, it is a principal object of the present invention to provide a new improved information display arrangement in the viewfinder of a camera or the like with the display of various camera functions being manually selectable by a switch arrangement to selectively display camera functions and related quantity information.

It is another object of the present invention to provide an information display arrangement in a viewfinder of a camera that automatically displays predetermined basic camera functions and warning status related thereto while providing selective controls operable by the camera user to display the function and related quantity information of various camera functions.

These and other objects will be apparent from the following disclosure taken in conjunction with the following drawings.

DETAILED DESCRIPTION OF THE PREFERRED EMBODIMENTS

Figure 1:
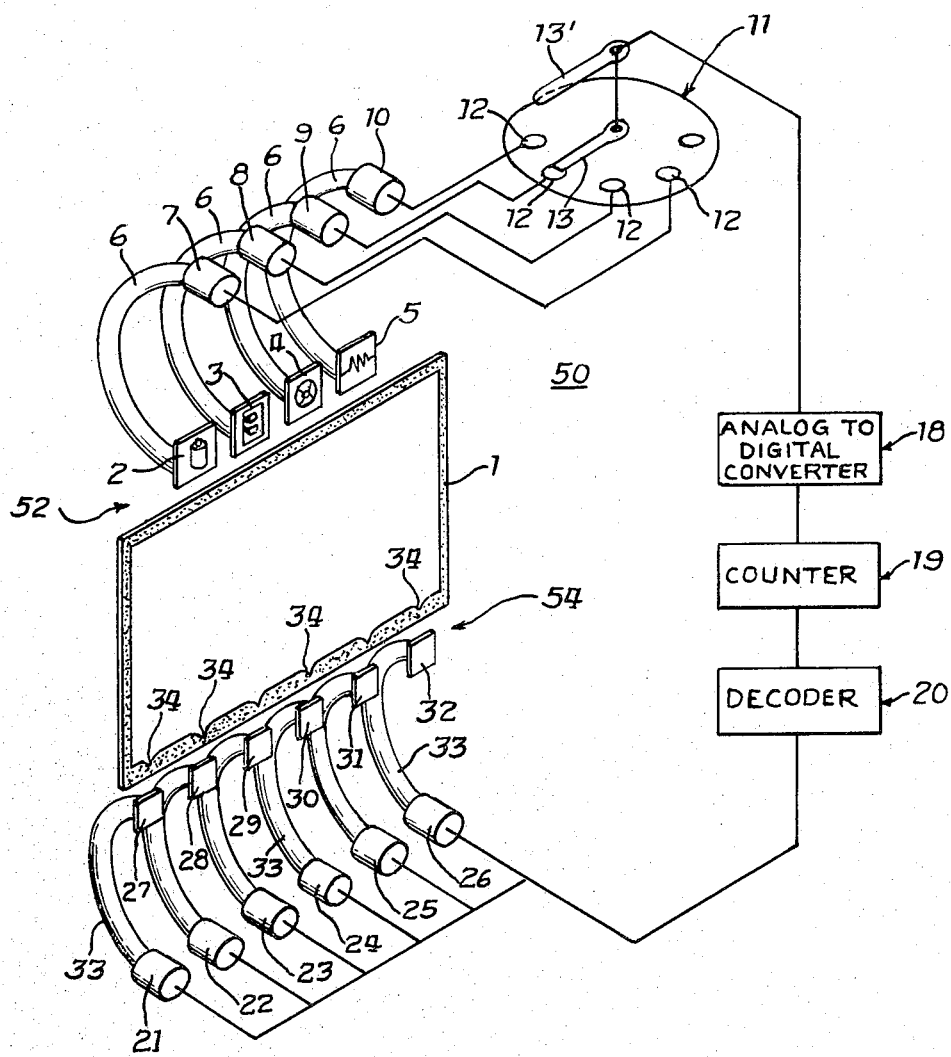
FIG. 1 is a perspective view and block diagram representation of the information display arrangement of the present invention.
Figure 2:
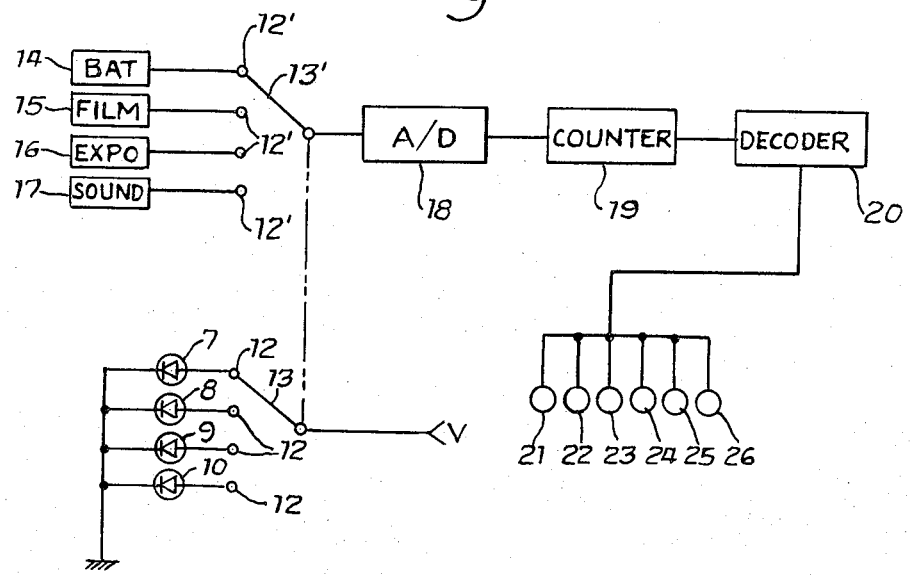
FIG. 2 is a block diagram and schematic representation of the control circuitry and display elements of the information display arrangement of FIG. 1.

Referring now to FIGS. 1 and 2, the information display arrangement 50 of the present invention is shown with portions of the information display arrangement disposed about a viewfinder 1 of a camera. The information display arrangement of the present invention is useful for still cameras, movie cameras, sound movie cameras, video cameras and other apparatus where the display of functions and parameters relating thereto is useful. The information display arrangement 50 includes a first plurality of function indicators 52 disposed along the top of the viewfinder 1 and a second plurality of quantity indicators 54 disposed along the bottom of the viewfinder 1. The function indicators 52 include a battery voltage indicator 2, a film supply indicator 3, an exposure or iris setting indicator 4 and a sound level indicator 5 if sound recording is applicable.

In a specific embodiment, the function indicators 2, 3, 4 and 5 are transparent plates or bezels including indicia and pictorial representations to depict the information. For example, the battery voltage indicator 2 includes a pictorial representation of a battery, the film supply indicator 3 includes a representation of one or more frames of film, the exposure setting indicator 4 includes an iris or aperture representation and the second recording level indicator 5 includes an audio sound wave representation. The various pictorial function representations are printed on the indicating surfaces in one specific embodiment. The function indicators 2 through 5 are respectively connected with light emitting diodes or other illumination devices 7 through 10 by means of respective optical fiber elements 6. Thus, when the light emitting diodes 7 through 10 corresponding to the connected function indicators 2 through 5 are energized, the respective function indicator is illuminated.

In the specific embodiment where light emitting diode (LED) devices are utilized for the illumination devices 7 through 10, the cathode of each LED device is connected to a ground reference and the anode of each light emitting diode is connected to a respective fixed contact 12 of a manually operable rotary switch arrangement 11. A movable center contact 13 is provided on the rotary switch arrangement 11 and is controlled by a connecting shaft and control knob for selecting one of the fixed contact positions 12 and energizing the connected light emitting diodes 7 through 10.

The control knob (not shown) of the rotary switch arrangement 11 is positioned on the outside of the camera housing at a suitable location to allow the camera user to select desired function and quantity indications while operating the camera. The rotary switch arrangement 11 includes a second switch level (not shown in FIG. 1) having fixed switch contacts 12' and a movable center contact 13'. The movable center contact 13' is operable by the control knob and movable with the movable contact 13. The second switch level provided by the fixed contacts 12' and the movable contact 13' is utilized to selectively connect a respective measurement circuit corresponding to each of the functions depicted at indicators 2 through 5 to analyzing and display circuitry.

For example, a battery measurement circuit 14 is connected to the fixed contact 12' of the upper switch level that is directly opposite and corresponding to fixed contact 12 on the lower level associated with the battery function indicator 2. A film supply measurement circuit 15, an exposure setting measurement circuit 16 and a sound recording level measurement circuit 17 are connected to a respective fixed contact 12' on the upper level of the switch arrangement 11 that is aligned with the fixed contact 12 on the lower switch level that corresponds the respective function indicator.

Each of the measurement circuits 14 through 17 is a voltage generating circuit which generates the corresponding voltage according to a quantity of the measured function. For example, the battery voltage measuring circuit 14 generates a voltage corresponding to battery voltage, measurement circuit 15 generates a voltage corresponding to the quantity of film footage remaining in the film supply, the exposure measurement circuit 16 generates a voltage corresponding to the exposure setting and the sound measurement circuit 17 generates a voltage corresponding to the sound recording level.

The movable contact 13' of the upper switch level is connected to the input of an analog-to-digital converter 18. The analog-to-digital converter 18 converts the outputs of the measurement of the circuits 14 through 17 to a digital signal. The digital output of the analog-to-digital converter 18 is connected to the input of a counter 19. The output of the counter 19 is connected to the input of a decoder 20. The output of the decoder 20 represents the measured quantity of the particular function to which the rotary switch arrangement is positioned.

The quantity indicators 54 in the specific embodiment illustrated in FIG. 1 include six indicators 27 through 32. The output of the decoder 20 includes a respective control line for each of the quantity indicators 27 through 32; six control lines in the specific embodiment shown in FIG. 1. Each of the control lines is connected to a respective illumination device 21 through 26. Each of the illumination devices 21 through 26 is connected to a respective one of the quantity indicators 27 through 32 by a fibre optic element 33. Thus, the quantity indicators 27 through 32 are illuminated in accordance with the control lines of the output of the decoder 20.

For example, in one arrangement, a full battery voltage or film supply is represented by all 6 indicators 27 through 32 being illuminated and a low battery supply or low film supply is represented by one indicator such as 27 being illuminated. In a specific embodiment, the lowest level quantity indicator 27 is a different color than the color of the indicators 28 through 32. For example, the indicator 27 is a red indicator and the indicators 28 through 32 are yellow indicators. It should also be understood that other combinations of different colors for each of the indicators 27 through 32 is also possible. The lower edge of the viewfinder 1 includes pointers or reference marks 34 corresponding to the position of each information quantity indicators 27 through 32. The pointers or reference marks 34 in a specific embodiment are provided by printing or metal evaporating on viewfinder 1.

Accordingly, the manually operable rotary switch arrangement 11 is selectively positioned by the camera user to indicate a camera function on one of the function indicators 2 through 5 and corresponding quantities associated with the camera function selected on the quantity indicators 27 through 32.

The analog-to-digital converter 18, the counter 19 and the decoder 20 are arranged to operate at a periodic data rate. Thus, updated quantity read out information for the selected function is provided to the user at periodic intervals, one second for example.

Figure 3:
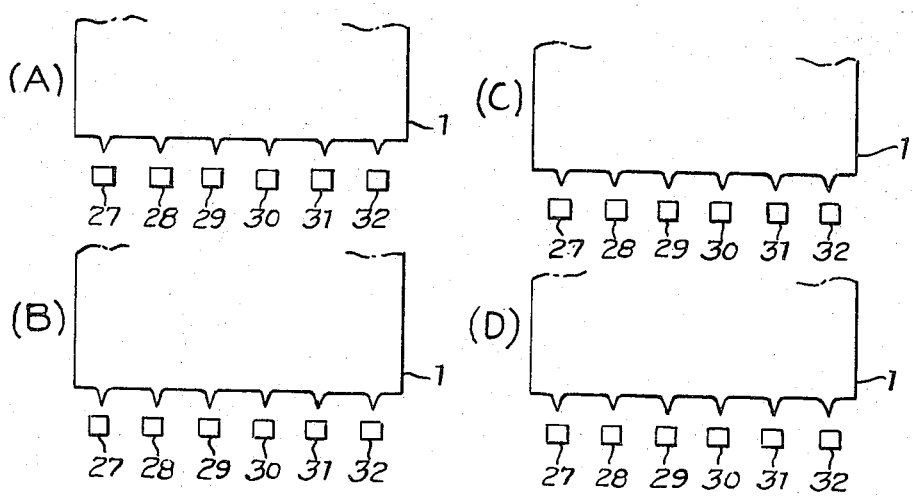
FIG. 3 is a representation of the information display arrangement of FIG. 1 concerning various quantity indicating methods of the information display arrangement of FIG. 1.

Referring now to FIG. 3, the manner in which the quantities indicated on the quantity indicators 27 through 32 includes a bar graph indicating method in FIG. 3A wherein the quantity of information is indicated from left to right with the number of illuminated indicators corresponding to the level of the quantity measured and represented. For example, the three lowest quantity indicators 27, 28 and 29 in FIG. 3A correspond to approximately one half of the quantity measured. When measuring film supply with function indicator 3 illuminated, quantity indicators 27, 28 and 29 being illuminated indicates approximately one half of the film supply remaining. If all 6 indicators are illuminated, an essentially full film supply is indicated. Concerning battery voltage, the indicators 27 through 32 in a specific embodiment correspond to the useful range of battery voltage to operate the camera rather than the number of volts per se. Thus, if the indicator 27 is illuminated, the state of the battery is marginal and at the lowest operating voltage to sustain camera functions. That is, any lower battery voltage may result in erratic operation or no operation whatsoever. Correspondingly, the six indicators 27 through 32 being illuminated represent a full battery supply.

In FIG. 3B, the one point indicating method is illustrated with the indicator 29 being illuminated to represent a quantity slightly less than one half of the middle of the measured quantity. Concerning the film supply, indicator 29 being illuminated represents that somewhat less than one half of the film supply remains.

In FIG. 3C, a two point indicating method is illustrated to provide more accurate quantity indications while using the same number of indicators. For example, the indicators 29 and 30 being illuminated represents the measured quantity such as film supply being approximately one half whereas indicator 29 alone being illuminated represents slightly less than one half the film supply remaining and indicator 30 being illuminated represents slightly more than one half of the film supply remaining.

In FIG. 3D, another form of one point indication is illustrated. In FIG. 3D when the quantity measured is between the levels represented by the indicators 29 and 30, the next highest indicator is illuminated corresponding to the quantity measured whereas in FIG. 3B the next lowest quantity is represented.

Figure 4:
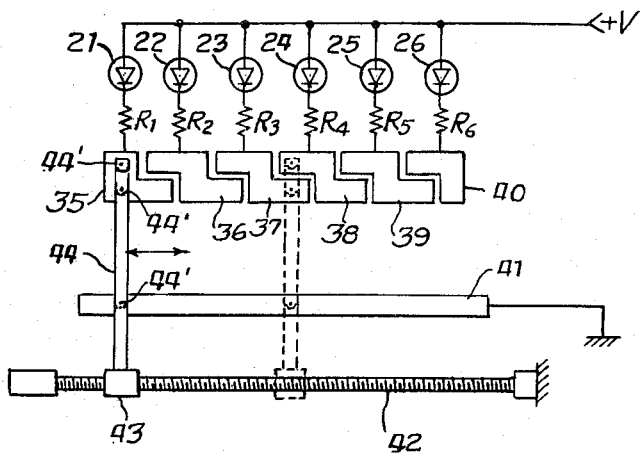
FIG. 4 is an elevational representation and schematic representation of a two point indicating method for film supply quantity indication in accordance with a specific embodiment of the information display arrangement of FIG. 1.

Considering now a specific embodiment for accomplishing a two point indicating method for film supply quantity and referring now to FIG. 4, fixed contacts 35 through 40 are provided with the left and right side contacts 35 and 40 being generally L-shaped and the contacts 36 through 39 being generally Z-shaped. Thus, a portion of adjacent contacts are overlapped with respect to a horizontal line but the fixed contacts are isolated one from the other without adjacent contact.

Each of the quantity illumination devices 21 through 26 is connected to a respective one of the fixed contacts 35 through 40 through a respective one of six resistors R1 through R6. The resistors R1 and R6 are different resistance values than R2 through R5 in a specific embodiment to provide a distinct warning indication as opposed to the advisory quantity information of the middle illumination devices connected throughout the resistors R2 through R5. Thus, different illumination levels are provided for advisory and warning indications.

A horizontal fixed contact 41 is provided as a ground connection below the fixed contacts 35 through 40 and spans the expanse of the fixed contacts 35 through 40. A threaded rod 42 is rotatably supported at two ends. One end of the threaded rod 42 is arranged to be driven by the film transport drive arrangement of the camera. Thus, the threaded rod 42 is rotating according to the usage of the film supply. A nut 43 is carried by the threaded rod 43 so as to be movable with rotation of the rod 42. An elongated vertically disposed movable contact bar 44 is carried by the nut 43.

The elongated contact bar 44 includes three protruding contacts points 44'. A first of the contacts 44' is arranged to be aligned with the fixed ground reference contact 41 and the other two contacts 44' are disposed to contact the fixed contacts 35 through 40 at two points. Thus, for predetermined positions of the nut 43 along the threaded rod 42, the contacts 44' will contact one of the fixed contacts 35 through 40. For other predetermined positions, the contacts 44' will contact two of the adjacent fixed contacts 35 through 40 in accordance with the shape of the fixed contacts 35 through 40. For example, when the nut 43 and the attached contact bar 44 are in the phantom position of FIG. 4, the fixed contacts 37 and 38 are contacted by contacts 44' and the two illumination devices 23 and 24 are actuated to illuminate the indicators 29 and 30. In the position indicated in FIG. 4, only the illumination device 21 is energized since only the fixed contact 35 is contacted.

In another specific arrangement, a contact bar 44 is provided with appropriate width dimensions and the fixed contacts 35 through 40 are generally rectangular with no overlapping. In this arrangement, the two point contact method is accomplished by the width of the contact 44 spanning two of the adjacent fixed contacts.

Figure 5:
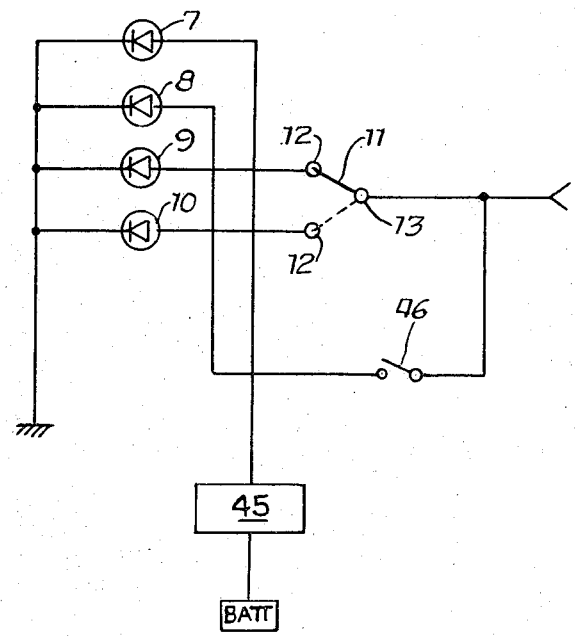
FIG. 5 is a block diagram and electrical schematic representation of a specific embodiment of portions of the information display arrangement of FIG. 1.

In another embodiment and referring now to FIG. 5, the rotary switch arrangement 11 is arranged to control the display of the exposure setting function indicator 4 and the sound recording function indicator 5. The battery voltage function indicator 2 and the film supply indicator 3 are controlled to provide indications without operation of the rotary switch 11 and independently of the position of the switch 11. Thus, a low film supply condition or a low battery supply condition is indicated regardless of the position of the rotary switch 11. This is useful since the battery and film supply functions are critical with respect to the operation of the camera; i.e., if the battery level or the film supply level is low, the camera is not operative and other functions are meaningless.

The battery supply is connected to a voltage detecting circuit 45 and the voltage detecting circuit 45 controls the energization of the battery voltage function indicator 2 to alert the camera user of a low battery condition at any time during camera operation independent of the setting of the rotary switch 11. Similarly, a switch 46 is connected to operate the film supply function indicator 3 independent of the rotary switch arrangement 11. Thus, the camera user is apprised of a low or used up film supply by the function indicator 2 even when the camera user has set the rotary switch 11 to monitor the exposure function or the sound level function. The switch 46 is operated when the film supply reaches a predetermined level corresponding to the film supply being nearly or completely expended.

In another embodiment, the two point indicating system illustrated in FIG. 3 is provided by the electrical circuits discussed in connection with FIG. 1 to actuate two quantity indicators for film quantity indication. Thus, when the film supply is between the quantities represented by two adjacent ones of the quantity indicators 27 through 32, the circuits 15, 18, 19 and 20 output control signals to actuate two adjacent indicators in accordance with the two point indicating method. Further, the display of operating information representing the other functions is also provided by the two point indicating method in accordance with the measurement circuits 15, 16 and 17 and the analog-to-digital converter 18, the counter 19 and the decoder 20.

The foregoing detailed description has been given for clearness of understanding only and no unnecessary limitations should be understood therefrom as some modifications will be obvious to those skilled in the art.

We claim:

1. A film supply quantity display for a camera comprising:
    film transport means;
    a support rod connected to said film transporting means and rotatable upon operation of said film transporting means;
    a movable member carried by said rod and movable by said rod from one end of said rod to the other as the film supply of the camera changes from a full film supply to the end of the film supply in response to operation of said film transporting means;
    a plurality of film supply quantity indicators arranged in a linear array representing film supply quantity;
    a plurality of fixed contacts, each of said fixed contacts being connected to respective ones of said quantity indicators, each of said fixed contacts that is connected to a quantity indicator that is between indicators at the ends of said array having a predetermined shape, means providing selective overlapping electrical contact between adjacent one of said fixed contacts;

a battery supply means;

movable contact means affixed to said movable member for actuating said quantity indicators by electrically coupling to said battery supply in accordance with the position of said movable member along said rod by selective contact with said fixed contacts, whereby said movable contact means contacts two adjacent ones of said fixed contacts when said movable member is at position along said rod corresponding to distance proportional to the film supply quantity between the quantity represented by two adjacent quantity indicators.

2. Apparatus as in claim 1 wherein each of said fixed contacts that is connected to the quantity indicator at the end of said array has a first predetermined shape.

3. Apparatus as in claim 2 wherein the said fixed contacts are rectangular in shape.

4. Apparatus as in claim 2 wherein each of said fixed contacts that is connected to a quantity indicator that is between said end indicators has a second predetermined shape.

5. Apparatus as in claim 4 wherein said contacts are Z-shaped.

6. Apparatus as in claim 1 wherein one terminal of said battery supply means is connected to said quantity indicators, and the other terminal of said battery supply means is connected to said movable contact.

7. Apparatus as in claim 1 wherein said means providing selective overlapping electrical contact comprises said fixed contacts being of predetermined shapes arranged in overlapping by non-contacting relationship with adjacent fixed contacts with respect to lines transverse to the plane of said linear array.

8. Apparatus as in claim 1 wherein said means providing said overlapping electrical contact comprise contact means affixed to said movable member in spaced relation to span at least two of the adjacent fixed contacts.

9. Apparatus as in claim 1 wherein said rod is threaded and said movable member is moved by the threads as said rod is rotated.

* * * * *